United States Patent Office 2,797,213

Patented June 25, 1957

2,797,213

ROSIN DERIVATIVES OF DIAZONAPHTHOL- AND DIAZOPHENOL-SULFONAMIDES

Ralph G. D. Moore, Chenango Forks, N. Y., assignor to General Aniline & Film Corporation, New York, N. Y., a corporation of Delaware No Drawing. Application August 20, 1954, Serial No. 451,294

5 Claims. (Cl. 260—141)

The present invention relates to diazooxides of aromatic sulfonamides in which the amide nitrogen is substituted by an alicyclic terpene radical of high molecular weight.

Diazooxides of aromatic sulfonamides with high molecular weight substituents on the amide nitrogen have been recommended for use in lithography and, in this connection, reference may be made, for instance, to German Patents Nos. 854,890; 865,108; 865,410; 871,668; 872,154 and the like. In the compounds embraced by these patents, the substituent group on the aforesaid nitrogen atom is either alkyl or aryl. The compounds as a class have a mixed, polar-non-polar character and for this reason are soluble practically in only very powerful solvents such as dimethylformamide, dimethylacetamide, dioxane and methyl Cellosolve. While these compounds have advantageous properties from the standpoint of sensitizing plates for lithography, due to their solubility characteristics, they provide a problem if used on various resin substrates. This is attributable to the fact that the powerful solvents needed to lay down these sensitizers penetrate and swell or dissolve the resin substrate, thus injuring the printing surface. There is, therefore, a decided need for high molecular weight diazooxides which, nevertheless, can be coated onto resin substrates from relatively simple organic solvents such as the alkyl esters, ketones and the like.

It has now been discovered that diazooxides of aromatic sulfonamides in which the substituent on the amido nitrogen is a high molecular weight alicyclic radical derived from colophony have very desired attributes as sensitizers for lithographic plates. For example, these compounds possess a structure of a saturated, unconjugated, non-polar character, as a consequence of which they are readily soluble in the common organic solvents. This is true despite the fact that such compounds have a very high molecular weight, i. e., some in excess of a thousand.

Diazooxides of aromatic sulfonamides in which the amido nitrogen is substituted by an alicyclic radical of high molecular weight such as rosin derivative and the preparation of the same constitute the purposes and objects of the present invention.

The diazooxides contemplated herein may be more specifically represented by the following general formulae:

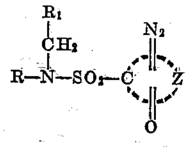

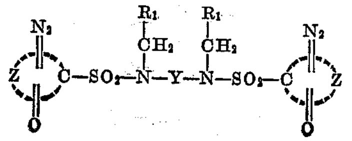

and

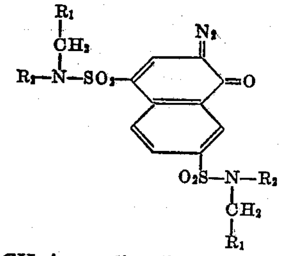

in which $R_1$—$CH_2$ is an alicyclic radical such as dehydroabietyl, dihydroabietyl, tetrahydroabietyl or dextropimaryl; R is hydrogen, alkyl such as methyl, ethyl and the like, hydroxyalkyl such as hydroxyethyl, hydroxypropyl and the like, Y is alkylene such as ethylene; $R_2$ is hydrogen, alkyl as above or hydroxyalkyl as above; Z equals the atoms necessary to complete a cyclohexadiene ring such as 1,5-cyclohexadiene, alkylcyclohexadiene i. e., methylcyclohexadiene, ethylcyclohexadiene and the like, halocyclohexadiene such as chlorocyclohexadiene, bromocyclohexadiene and the like, or a di- or polyhydronaphthalene ring; and $=N_2$ and $=O$ always occupy adjacent positions in the same ring.

Examples of compounds which are embraced by the above formulae are the following:

(1) N - dehydroabietyl - 6 - diazo - 5(6) - oxo - 1-naphthalenesulfonamide of the probable formula:

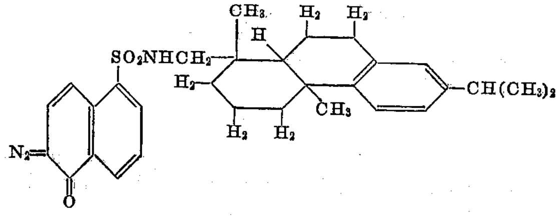

(2) N - dehydroabietyl - 3 diazo - 4 - oxo - 1,5 -cyclohexadiene - 1 - sulfonamide of the probable formula:

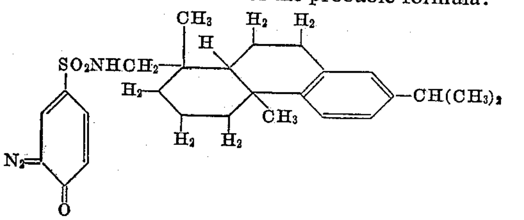

(3) N - dehydroabietyl - N - 2 - hydroxyethyl - 6 - diazo - 5(6) - oxo - 1 - naphthalenesulfonamide of the probable formula:

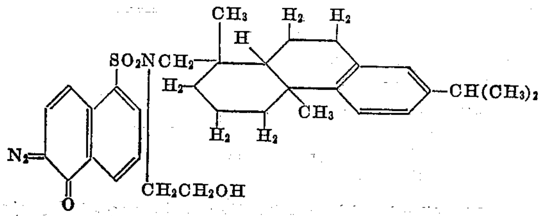

(4) N - dehydroabietyl - N - ethyl - 6 - diazo - 5(6)-oxo - 1 - naphthalenesulfonamide of the probable formula:

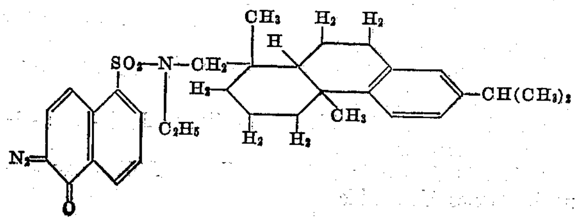

(5) N,N′ - didehydroabietyl - N,N′ - ethylenebis -(6-diazo - 5(6) - oxo - 1 - naphthalenesulfonamide) of the probable formula:

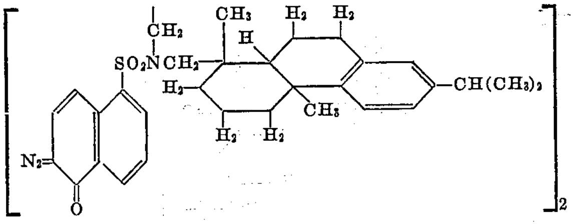

(6) N - dehydroabietyl - 3 - diazo - 6 - methyl - 4 - oxo-1,5 - cyclohexadiene - 1 - sulfonamide of the probable formula:

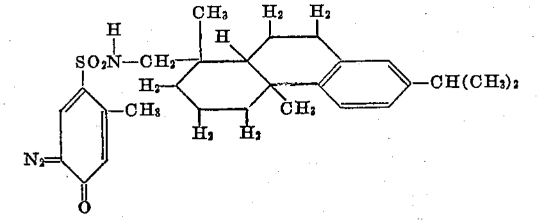

(7) N-dehydroabietyl - 3 - chloro - 5 - diazo - 6 - oxo-1,3 - cyclohexadiene - 1 - sulfonamide.

(8) N - dehydroabietyl - 3 - diazo - 4(3) - oxo - 1-naphthalenesulfonamide of the probable formula:

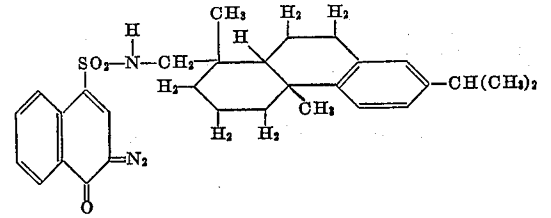

(9) N - dehydroabietyl - 5,6,7,8 - tetrahydro - 4 - diazo-3(4) - oxo - 2 - naphthalenesulfonamide of the probable formula:

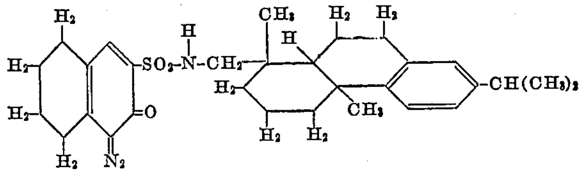

(10) N,N′ - didehydroabietyl - 3 - diazo - 4(3) - oxo-1,6 - naphthalenedisulfonamide of the probable formula:

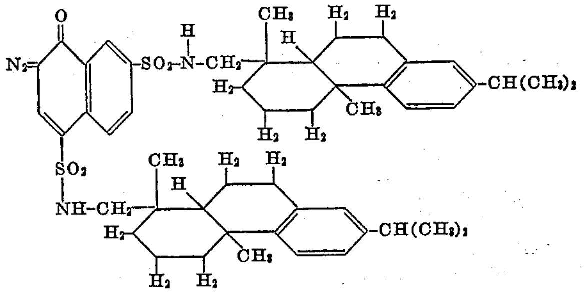

(11) N - dihydroabietyl - 3 - diazo - 4 - oxo - 1,5-cyclohexadiene - 1 - sulfonamide.

(12) N - tetrahydroabietyl - 3 - diazo - 4 - oxo - 1,5-cyclohexadiene - 1 - sulfonamide.

(13) N-dextropimaryl - 3 - diazo - 4 - oxo - 1,5 - cyclohexadiene - 1 - sulfonamide.

(14) N-dihydroabietyl - 6 - diazo - 5(6) - oxo - 1 - naphthalenesulfonamide.

(15) N - tetrahydroabietyl - 6 - diazo - 5(6) - oxo - 1-naphthalenesulfonamide.

(16) N - dextropimaryl - 6 - diazo - 5(6) - oxo - 1-naphthalenesulfonamide.

Many of the above compounds may be prepared by the reaction of a selected diazooxide of an aromatic sulfonyl chloride with a suitable rosin amine. The reaction medium may be any liquid which is a sufficiently good solvent for the starting materials to permit interreaction and is sufficiently inert towards the sulfonyl chloride to prevent mutual reaction under the prevailing conditions. The preferred solvents are isopropyl alcohol and dioxane.

The rosin amines which may be employed are dehydroabietylamine, dihydroabietylamine, tetrahydroabietylamine, dextropimarylamine, 2 - dehydroabietylaminoethanol, N - methyldehydroabietylamine, N - ethyldehydroabietylamine, N,N′ - ethylenedidehydroabietylamine and the like. These amines are available either as such or in admixture with each other and either the individual amines or such mixtures may be employed. Of particular utility is the commercially available preparation known as "Rosin Amine D" which contains about 90% dehydroabietylamine.

Diazo sulfonyl chlorides which may be used as such include 6 - diazo - 5(6) - oxo - 1 - naphthalenesulfonyl chloride of the following formula:

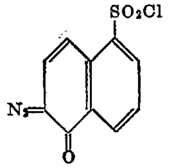

3 - diazo - 4 - (3) - oxo - 1 - naphthalenesulfonyl chloride of the following formula:

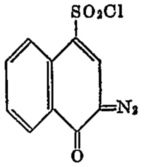

3 - diazo - 4 - oxo - 1,5 - cyclohexadiene - 1 - sulfonyl chloride of the following formula:

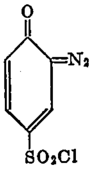

My compounds may also include as the sulfonyl moiety 5,6,7,8-tetrahydro - 4 - diazo - 3 - (4) - oxo - 2 -naphthalenesulfonyl of the formula:

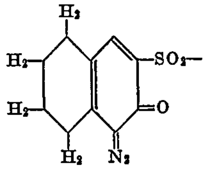

3 - diazo - 4(3) - oxo - 1,6 - naphthalenedisulfonyl of the formula:

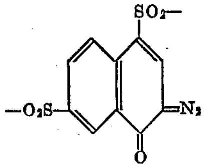

3 - chloro - 5 - diazo - 6 - oxo - 1,3 - cyclohexadiene-1-sulfonyl of the formula:

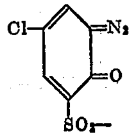

3 - diazo - 5 - methyl - 4 - oxo - 1,5 - cyclohexadienesulfonyl of the formula:

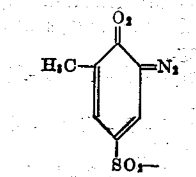

3 - diazo - 6 - methyl - 4 - oxo - 1,5 - cyclohexadienesulfonyl of the formula:

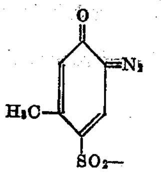

and the like.

These moieties may be introduced into the rosin derivative, among other methods, according to the general procedures described in German Patents Nos. 888,204 and 871,668 for example. Thus, where the aromatic sulfonyl radical is monocyclic, the corresponding aminohydroxysulfonic acid may be converted into a benzoxazolone sulfonyl chloride which, in turn, may be reacted with the desired rosin amine. The benzoxazolone ring then may be cleaved by heating with alkali and the resulting aminohydroxysulfonamide may be converted to its hydrochloride. With or without isolation the hydrochloride then can be diazotized to form the diazooxide.

In the event that the moiety containing two sulfonyl groups is to be introduced, this result may be achieved by the method of Example 10 of German Patent No. 871,668.

The invention will be further illustrated by the following examples. It is understood, however, that the invention is not limited to these examples.

EXAMPLE I

*N-dehydroabietyl-6-diazo-5(6)-oxo-1-naphthalenesulfonamide*

To a stirred solution of 28.5 grams of "Rosin Amine D" (Hercules Powder Company) in 160 ml. of dioxane, 28.5 grams of 6 - diazo - 5(6) - oxo - 1 -naphthalenesulfonyl chloride were added. The temperature rose to 42° C., the chloride dissolved and 40 ml. of sodium carbonate solution, 3N, was added over about five minutes. The reaction mixture was then heated to 45–50° C. and allowed to cool to room temperature with stirring over a period of one and one-half hours. With continued stirring 300 ml. of ice water was added slowly, together with seed crystals from a previous preparation. The oil which first separated solidified slowly into small beads. After two hours' refrigeration the yellow product was collected, washed, and dried under reduced pressure. The yield was practically quantitative. Purification could be effected by solution in alcoholic sodium hydroxide, filtration, and precipitation with aqueous acetic acid (M. P. 115–36° C. (dec.)), or more simply by recrystallization from alcohols, ethyl acetate, acetone or aqueous dioxane.

The sulfonyl chloride used above and in Examples III, IV and V was prepared by a method similar to that described in German Patent No. 865,410, page 2, lines 98–103.

EXAMPLE II

*N-dehydroabietyl-3-diazo-4-oxo-1,5-cyclohexadiene-1-sulfonamide*

A solution of 8.6 grams of "Rosin Amine D" in 50 ml. of dioxane was treated with 6.6 grams of 3-diazo-4-oxo-1,5-cyclohexadiene-1-sulfonyl chloride (M. P. 111–2° C. dec. (cor.)), followed by 12 ml. of aqueous sodium carbonate, 3N. The reaction mixture, which had warmed spontaneously to 40–50° C., was stirred for about one and one-half hours and then was treated slowly with 100 ml. of cold water. The oil which precipitated, after overnight refrigeration, was isolated and dried under vacuum. After this treatment it was a dark, friable, photosensitive solid.

The sulfonyl chloride used above was prepared by the method described in German Patent No. 888,204, page 10, lines 23–27.

EXAMPLE III

*N-dehydroabietyl-N-2-hydroxyethyl-6-diazo-5(6)-oxo-1-naphthalenesulfonamide*

The reaction between 33 grams of 2-dehydroabietylaminoethanol (Hercules "Polyrad 0100") and 28.5 grams of 6-diazo-5(6)-oxo-1-naphthalenesulfonyl chloride in 160 ml. of dioxane was carried out by the procedure described in Example I. The yellow product obtained was very photosensitive. It melted with decomposition at about 95–105° C.

EXAMPLE IV

*N,N'-didehydroabietyl-N,N'-ethylenebis (6-diazo-5(6)-oxo-1-naphthalenesulfonamide)*

The reaction between 15 grams of N,N'-ethylenedidehydroabietylamine in 80 ml. of dioxane, 14.2 grams of 6-diazo-5(6)-oxo-1-naphthalenesulfonyl chloride in 20 ml. of sodium carbonate, 3N, was carried out as described in Example I. The product, a dark colored tar which crystallized slowly, melted at about 105° C. with decomposition.

The ethylenediamine intermediate was prepared by reacting theoretical amounts of "Rosin Amine D" and ethylene bromide in xylene at 140° C., followed by treatment with sodium hydroxide solution to free the base from the dihydrobromide.

EXAMPLE V

*N-dehydroabietyl-6-diazo-5(6)-oxo-1-naphthalenesulfonamide*

The procedure was the same as in Example I, excepting that 200 ml. of isopropyl alcohol was substituted for the dioxane and the amount of ice water was reduced from 300 ml. to 100 ml. The use of isopropyl alcohol eliminated the initial separation of the product as an oil, leading to a finely divided yellow solid which was easy to dry, required no purification, and usually melted above 150° C.

Modifications of the invention will occur to persons skilled in the art. Thus, as is evident, any of the sulfonyl chlorides mentioned above may be used with any of the indicated rosin amines. Similarly, any of the rosin amines may have the disclosed sulfonyl moieties attached thereto by procedures of the prior art. I, therefore, do not intend to be limited in the patent granted except as necessitated by the appended claims.

I claim:

1. Aromatic diazooxide sulfonamides selected from the class consisting of those having the following formulae:

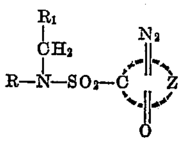

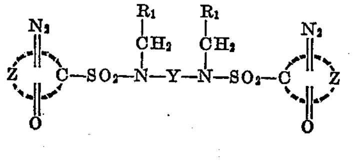

and

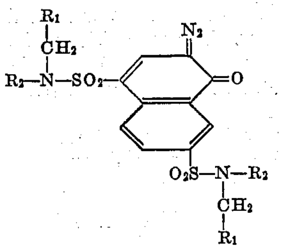

in which $R_1$—$CH_2$ is selected from the class consisting of dehydroabietyl, dihydroabietyl, tetrahydroabietyl and dextropimaryl; R is selected from the class consisting of hydrogen, alkyl and hydroxyalkyl; Y is alkylene; $R_2$ is selected from the class consisting of hydrogen, alkyl and hydroxyalkyl; Z represents the atoms necessary to complete a ring selected from the class consisting of cyclohexadiene, dihydronaphthalene and polyhydronaphthalene rings; and $=N_2$ and $=O_2$ always occupy adjacent positions in the same ring.

2. N-dehydroabietyl - 6 - diazo -5(6) - oxo - 1-naphthalenesulfonamide.

3. N-dehydroabietyl - 3 - diazo - 4 - oxo - 1,5 -cyclohexadiene-1-sulfonamide.

4. N-dehydroabietyl - N - 2 - hydroxyethyl - 6 - diazo-5(6) - oxo - 1 naphthalenesulfonamide.

5. N,N' - didehydroabietyl - N,N' - ethylenebis (6-diazo - 5(6) - oxo - 1 -naphthalenesulfonamide).

No references cited.